(12) United States Patent
Li et al.

(10) Patent No.: US 10,819,426 B2
(45) Date of Patent: Oct. 27, 2020

(54) TECHNIQUES FOR DECODING LIGHT-BASED COMMUNICATION MESSAGES

(71) Applicant: Osram Sylvania Inc., Wilmington, MA (US)

(72) Inventors: Yang Li, Georgetown, MA (US); Sergio Bermudez, Boston, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 16/642,535

(22) PCT Filed: Sep. 13, 2017

(86) PCT No.: PCT/US2017/051265
§ 371 (c)(1),
(2) Date: Feb. 27, 2020

(87) PCT Pub. No.: WO2019/054994
PCT Pub. Date: Mar. 21, 2019

(65) Prior Publication Data
US 2020/0186244 A1    Jun. 11, 2020

(51) Int. Cl.
*H04B 10/11* (2013.01)
*H04B 10/116* (2013.01)

(52) U.S. Cl.
CPC ........... *H04B 10/11* (2013.01); *H04B 10/116* (2013.01)

(58) Field of Classification Search
CPC .... H04B 10/11; H04B 10/116; H04B 10/1123
(Continued)

(56) References Cited

U.S. PATENT DOCUMENTS

| | | |
|---|---|---|
| 5,870,390 A | 2/1999 | Campanella |
| 2011/0200338 A1 | 8/2011 | Yokoi |

(Continued)

FOREIGN PATENT DOCUMENTS

| | | |
|---|---|---|
| EP | 0872049 A1 | 7/1997 |
| EP | 3203658 A1 | 8/2017 |

OTHER PUBLICATIONS

Xu, et al., Quantifying Signals With Power-Law Correlations: A Comparative Study of Detrended Fluctuation Analysis and Detrended Moving Average Techniques, Center for Polymer Studies and Department of Physics, Boston University, INFM and Physics Department, Politecnico di Torino, Feb. 2, 2008, (15 pages). (The article provided herewith Version 2, whereas the article cited on the International Search Report is Version 1).

(Continued)

*Primary Examiner* — Dalzid E Singh
(74) *Attorney, Agent, or Firm* — Yutian Ling

(57) ABSTRACT

Techniques are disclosed for decoding light based communication (LBC) messages transmitted between a transmitter device and a receiver device. The receiver device includes a processor that executes a process to decode a received LBC message. The processor determines a moving average and removes the moving average to provide a second digital message (with the moving average removed), to account for any noises or interferences. The moving average may be determined using a length-preserving moving average. The peak location in the second digital message is identified and used as a start position for synchronization when the peak location is above the threshold. Sampling points are derived, and logical maximum and minimum values (1's and 0's) are assigned to one or more of the sampling points. The logical values are decoded to generate a decoded sequence of data representative of the received LBC message.

20 Claims, 6 Drawing Sheets

(58) Field of Classification Search
USPC .......................................................... 398/118
See application file for complete search history.

(56) References Cited

U.S. PATENT DOCUMENTS

| | | | |
|---|---|---|---|
| 2012/0086345 A1* | 4/2012 | Tran ........................ | H04L 12/44 |
| | | | 315/158 |
| 2012/0257901 A1* | 10/2012 | Yamada ............... | H04B 10/116 |
| | | | 398/130 |
| 2014/0186026 A1* | 7/2014 | Oshima ............... | H04B 10/516 |
| | | | 398/25 |
| 2014/0186049 A1* | 7/2014 | Oshima .................. | H04W 4/21 |
| | | | 398/118 |
| 2016/0359558 A1* | 12/2016 | Baggen .................. | H05B 47/19 |

OTHER PUBLICATIONS

Ganzmann, Anna, International Search Report and Written Opinion of the International Searching Authority, for counterpart application PCT/US2017/051265, dated May 16, 2018, European Patent Office, Rijswijk, The Netherlands, 11 pages.

* cited by examiner

TECHNIQUES FOR DECODING LIGHT-BASED COMMUNICATION MESSAGES

CROSS REFERENCE TO RELATED APPLICATION

The present application is a National Stage application of, and claims priority, and the benefit of, International Application No. PCT/US2017/051265, filed on Sep. 13, 2017, entitled "TECHNIQUES FOR DECODING LIGHT-BASED COMMUNICATION MESSAGES", which is hereby incorporated by reference in its entirety.

FIELD OF THE DISCLOSURE

The present disclosure relates to light-based communication systems, and more particularly to systems and techniques for decoding light-based communication messages.

BACKGROUND

Light based communication (LBC) digital messages may be used to transmit data between a transmitter device and a receiver device, for example using a visible light communication (VLC) link or a non-visible light communication link, such as infrared. An optical transmitter is configured to transmit an LBC message to an optical receiver in an LBC system. For example, an LBC message may be used to determine the position of an object with respect to another object (such as in vehicle-to-vehicle positioning or object tracking) based on angle of incidence associated with the received LBC message. In other use-cases, such as light-based navigation systems, an LBC message may be used to transmit an identifier number associated with the luminaire that generated the LBC message. An LBC receiver may receive the identifier and determine a physical location associated with that luminaire.

DETAILED DESCRIPTION

Figure 1:
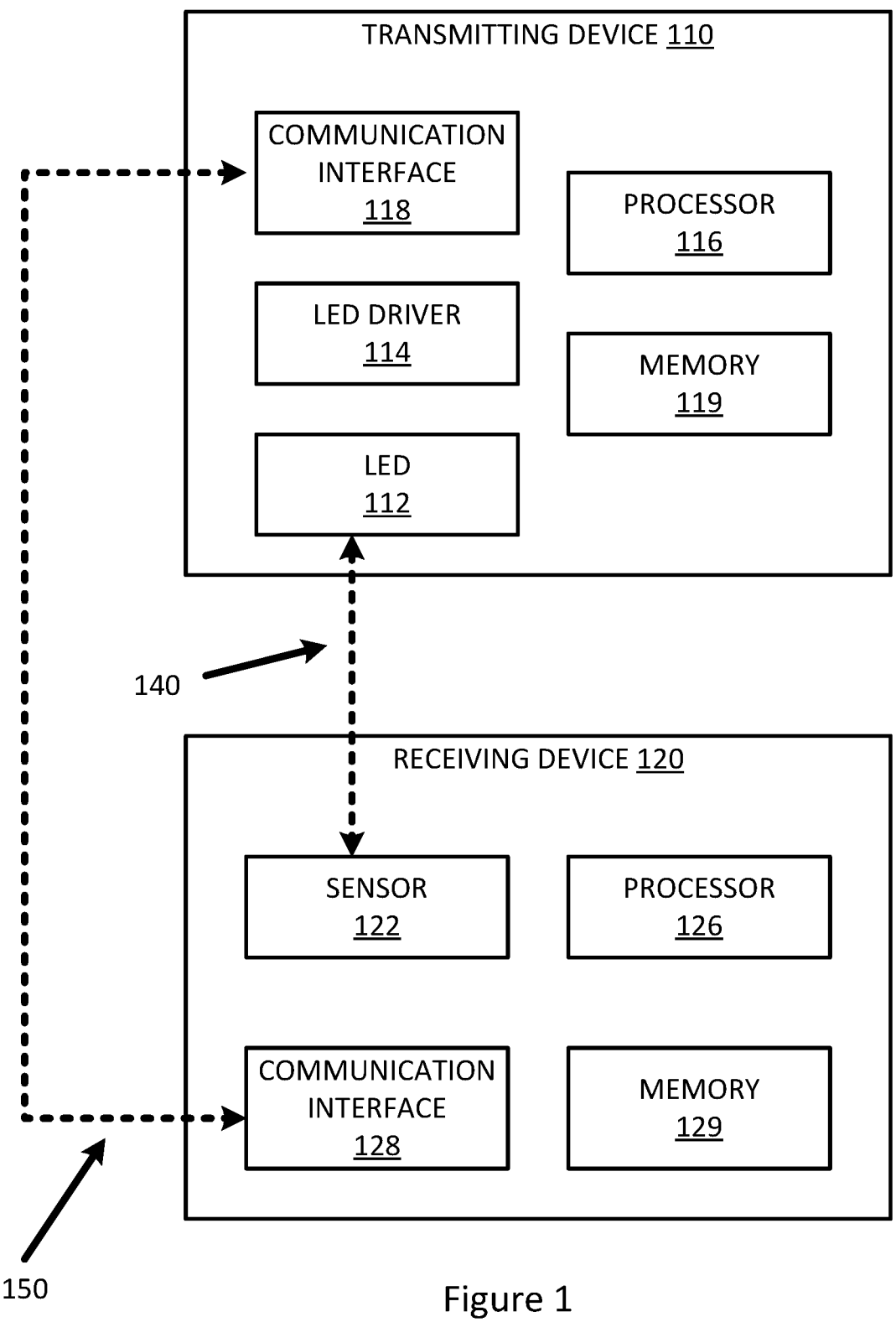
FIG. 1 illustrates a block diagram of a light based communication (LBC) system, where a transmitter device communicates with a receiver device via LBC messages, in accordance with an embodiment of the present disclosure.

Techniques are disclosed for decoding light based communication (LBC) digital messages, or other optical pulsed light messages. An LBC message (or "light-based digital message" as used herein) is a light-based digital message that is transmitted and received as pulses of light in a sequence that represent bits of data. As will be appreciated, the techniques may be embodied in an LBC system. In one such example embodiment, the techniques are implemented in an LBC system that uses light-based digital messages to communicate between a transmitter device and a receiver device. The receiver device includes a processor that executes a process to decode the LBC messages. The processor receives, at a receiver device, a light-based digital message transmitted from a transmitter device. The processor of the receiver device determines a moving average of the light-based digital message. The moving average is removed to provide a second digital message having the moving average removed, which accounts for any interferences. The peak is identified to determine the starting point for the synchronization. The maximum and minimum samplings points are determined. The maximum and minimum values are decoded into 1's and 0's to provide a sequence of data representative of the light-based digital message received from the transmitter device. To achieve robustness, the moving average may be a length-preserving moving average, in which the window size varies depending upon a parameter of the received light-based digital signal.

General Overview

Implementing an LBC system involves a number of non-trivial issues, particularly for example in light-based communication systems embodied in physical hardware devices, software, or operating systems. Light-based communication, such as visible light, infrared light, or RF (radio frequency) light, may be prone to error due to additive noises and interferences, for example that exist in the physical layer of operating systems and devices. Noise may come, for example, from an LED driver, the thermal noise of the receiver, and other ambient light sources. Interference may come, for example, from AC coupling of LED drivers, the effects of movement or air turbulence between the transmitter and the receiver, possible mechanical vibrations or movements of the transmitter and/or the receiver, or any combination of the above, or all of the above. Movement or air turbulence may result from various reasons, such as temperature differences, movement or objects, artificial air circulations, wind, or other conditions. One possible solution to such noises and interferences is to provide a stringent specification for the encoder, modulator, LED driver, and any other components of the light based communication path. For example, specific requirements for components may be used to ensure accurate timing of the modulation of the signal, tolerate very low level of tolerance of jitter noise of only baseband signal, or rely on the acknowledgment/transmission retry mechanisms with complex channel coding techniques. However, this requires specific components having stringent specification, which may become quite costly. Some techniques rely on a rolling shutter camera, which may also be expensive. There is a need, therefore, for a system to inexpensively decode light based communication messages without requiring specialized components to provide an affordable system and method for decoding light-based digital messages. There is a further need for a system and method that accounts for the noise and interferences to robustly decode light-based digital messages.

Thus, in accordance with an embodiment of the present disclosure, a system is provided for decoding light-based digital messages that does not utilize stringent constraints on the encoder, modulator, and LED driver to perform the encoding (LBC signal generation). The system removes low frequency interferences and reduces the amount of overhead used for complex channel coding on the transmitted signal. The frequency interferences are "low" in that they are relatively low in frequency when compared to the desired signal frequency, but still high enough such that the interference frequency is too close to the desired signal frequency range for traditional filtering techniques to reliably remove the interference without significantly suppressing the signal itself. The system may also reduce constraints on movement, heat, air circulation, and weather conditions, to allow for decoding of light based communication in all environments including noise and other interferences. The system may also avoids the use of specific time synchronizations or other signals (such as a pilot signal) in order to synchronize the transmitter device and the receiver device, providing an inexpensive decoding system. The system may also relax constraints on the LBC encoder, modulator, LED driver, and other components of the encoding and decoding system. The system may also reduce the amount of channel coding overhead on the transmitted light-based digital message, and also reduces the decoding channel complexity of decoding algorithm. Other advantages will be apparent in light of the present disclosure, as will numerous variations and embodiments.

Light-Based Communication (LBC) System

FIG. 1 illustrates a block diagram of a light based communication (LBC) system, where a transmitter device communicates with a receiver device via light-based communication, in accordance with an embodiment of the present disclosure. A transmitting device 110 and a receiving device 120 communicate with each other using light based communication via a light-based communication path 140. The light-based communication path 140 is an optical communication path between the transmitting device 110 and the receiving device 120 in which communication is accomplished using pulses of light that represent bits of data.

The transmitting device 110 includes a light source, such as a light emitting diode (LED) 112, which is controlled by an LED driver 114. The LED driver 114 is coupled to a processor 116 having a memory 119. The LED 112 transmits an LBC message using the LED 112 as controlled by the LED driver 114. The transmitting device 110 also includes a communication interface 118 for providing a distinct communication path 150 to the receiving device 120 that is different from the light based communication path 140. The communication interface 118 provides a second path of communication 150 to the receiving device 120, for example via wireless communication, such as Wi-Fi®, or Bluetooth®, or other short range communication network. The memory 119 may have a process stored thereon that, when executed, causes the processor 116 to encode the light-based digital message(s). Any number of standard or proprietary encoding schemes may be used, as will be appreciated.

The transmitter device 110 is shown as having a LED 112 as the light source; however any optical light source or optical transmitter element may be implemented, as will be appreciated in light of the present disclosure. For example, the light source 112 may be a luminaire or an infrared LED with use of a matching sensor that responds to infrared, or other light sources may be implemented.

The receiving device 120 includes a sensor 122, a processor 126, a memory 129, and a communication interface 128. The sensor 122 may be any optical receiver element, such as a camera, a photo detector, light sensor, or another optical sensor, and is configured for receiving the light based communication message(s) from the transmitting device 120 via the light-based communication link 140. The communication interface 128 provides the second communication path 150 that is distinct from the light based communication path 140 between the optical transmitter element of the transmitting device 110 and the optical receiver element of the receiving device 120. As will be appreciated in light of the present disclosure, the second communication path 150 may be provided to allow for other data to be sent between the transmitter and the receiver, such as the transmitter instructing the receiver to change modulation depth.

The memory 129 stores a decoding process, such as the example decoding scheme that will be discussed in turn with reference to FIG. 2. Processor 126 may access memory 129 to execute the decoding scheme to process incoming LBC messages received from the transmitting device 110 via link 140. The processor 126 may carry out other tasks as well, such as facilitate communication with the transmitting device 110 over the back-communication channel 150. Memory 129 may be any suitable non-transitory storage device or facility accessible to processor 126, such as a hard-drive, sold-state disc drive, RAM, ROM, embedded memory of a microcontroller that includes processor 126, or on-chip cache memory, to name a few examples.

It will be appreciated in light of the present disclosure that although a single transmitter device and a single receiver device are shown in the LBC system of FIG. 1, multiple transmitter devices and receiver devices may be implemented in an LBC system. Further, each transmitter device may be coupled to a receiver device to provide multiple transceiver devices. In one example embodiment, one object, such as a vehicle or a luminaire, has both a transmitter device and a receiver device, and a second object, such as another object or a vehicle, includes both a transmitter device and a receiver device to allow for bi-directional communication between the first transceiver and the second transceiver.

Methodology

Figure 2:
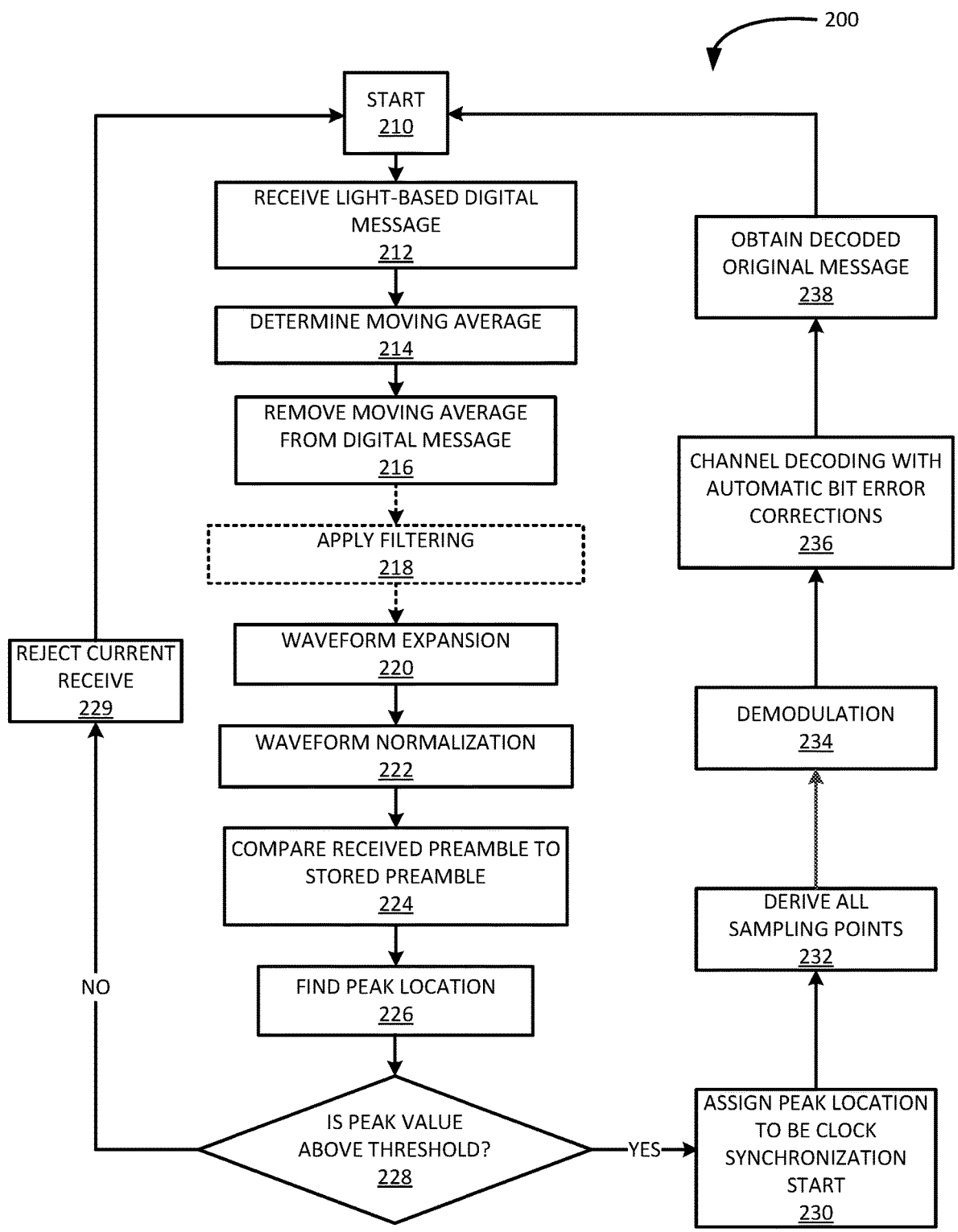
FIG. 2 illustrates a flow chart of an example methodology for decoding LBC messages received at a receiver device, in accordance with an embodiment of the present disclosure.

FIG. 2 illustrates a flow chart of an example methodology for decoding LBC messages received at a receiver device, in accordance with an embodiment of the present disclosure. FIGS. 3-10 illustrate various example graphical diagrams corresponding to various stages of the methodology of FIG. 2. As noted above, the methodology may be executed or otherwise controlled by, for example, one or more processors included in or otherwise accessible by the receiving device or node of the LBC system.

Referring to FIG. 2, an example methodology 200 for decoding LBC digital messages is shown, which starts at block 210. At block 212, a light-based digital message is received at a receiver device, for example, the receiver device 120 of FIG. 1. At block 214, the moving average of the light-based digital message is determined using a predetermined window size. The window size varies depending upon one or more parameters of the light-based digital message. For example, the parameter of the light-based digital message may be the frequency of the message or the shape of the waveform.

In an example embodiment, the moving average window size may be a length-preserving moving average window size. A predetermined (i.e. before sampling begins) number of samples may be included in each window size. For example, a window size of three (3) samples may be selected, and this window size may be used in a moving average (in which three samples are taken at a time and an average is determined for those three samples, and then a next three samples are taken and determined an average for those). One example sampling may include: the average of #1, #2, and #3; then the average of #2, #3, and #4; and then the average of #3, #4, and #5; etc. Determining (and then subsequently removing) the moving average helps to remove any interferences from the received data. In a traditional predetermined window size, the average may not be computed until the number of samples obtained matches the number of samples used for each average in the moving average. For example, if 10 samples are determined to be the appropriate window size, the processor is not able to start averaging until 10 samples have been received. Further, the average of the first 10 samples may not be as accurate as the remaining samples because, for example, sample 1 is only accounted for one time, whereas sample 10 will be accounted for well over 10 times.

Contrast the traditional predetermined window size with a length-preserving moving average window size in which the number of samples available is taken into account, rather than simply a set number of samples per sampling window. For example, if two samples are available, but a traditional window size is 10 samples, the length-preserving moving average will determine an average of the two available samples, and then the average of three samples, and four samples, until it reaches 10 samples. Thereafter, each window size thereafter may be 10 samples in length. This ensures accuracy of the system, allows for processing to commence sooner, and also provides a more accurate average of the first few samples. For example, the second sample is included in the average of the 1st and 2nd, the 1st through the 3rd, the 1st through the 4th, the 1st through the 5th, the 1st through the 6th, and so on, rather than just the 1st through the 10th and the 2nd through the 11$^{th}$, as with the traditional moving average sampling window.

At block 216, the moving average that is determined at block 214 is removed from the light-based digital message to provide a second (averaged) light-based digital message. The moving average is removed from the received light-based digital message by subtracting the obtained moving average from the received light-based digital message. Removing the moving average helps significantly remove any low frequency component, thereby reducing any noise or interference that is too close to the signal frequency for traditional filtering techniques to reliably remove the interference without significantly suppressing the signal itself.

At block 218, filtering optionally be applied to the second light-based digital message, in accordance with an embodiment of the present disclosure. The filtering may be any digital low-pass, band-pass, or high-pass filtering on the resulting waveform. The filtering ensures that any out-of-band frequency components, such as noise, are removed from the second-light-based digital message.

At block 220, waveform expansion on the digital message resulting from block 218 may be performed. During waveform expansion, the received sample values of the digital message are replaced with either the raw maximum value or minimum value, depending on a thresholding of the received digital signal sample values against a threshold. The threshold may, for example, be the moving average determined in block 214. Each received sample value may be compared to the moving average for that value, and if above the moving average, replaced with the maximum value, and if below the moving average replaced with the minimum value.

At block 222, following optional waveform expansion, waveform normalization may be performed to replace the maximum and minimum values to a specified value, such as "1" and "−1". The choice of exact values is flexible, as long as it is one positive value and one negative value with the same magnitude. The value selected depends on a thresholding of the digital message sample values against a threshold. The threshold may, for example, be the moving average obtained from block 214 above. Each sample value in the normalized waveform may be compared to the moving average as a threshold. If the sample value is above the threshold value then it is replaced with the positive value, and if the sample value is below the threshold value then it is replaced with the negative value.

It will be appreciated in light of the present disclosure that in some embodiments, the methodology may omit blocks 220 and 222, and perform the decoding without the waveform expansion and without the waveform normalization.

At block 224, the preamble of the received digital message is compared to a local copy of the signal preamble. For example, the comparison may be performed by a cross-correlation or other comparing technique. The preamble of the waveform is added to the waveform by the transmitter at every transmission of a light-based digital message to help the receiver to synchronize to the start and stop timing, as well as all the start and stop timing of the information bits contained in the light-based digital message. The receiver has a local copy of the preamble stored in local memory, which is also known to the transmitter. Thus, the preamble of the received digital message may be compared (or otherwise cross-correlated) to the local copy of the preamble to determine the start position of the digital message. The preamble may be chosen so that it is guaranteed that the intended light-based digital message does not contain the preamble pattern. For example, using the Hamming (7, 4) code for example: each original message sequence is 4-bit long, and each resulting coded message (codeword) is 7-bit long. There are a total of $2^4=16$ valid codewords out of $2^7=128$ seven-bit words possible. A conceptual ball of radius 1 (using Hamming distance) may then be defined about each codeword as the set of all words that differ from the codeword by at most 1 bit. There are eight words in the conceptual ball of radius 1 about each codeword: the codeword itself and the seven words that differ from the codeword in the first, second, third, fourth, fifth, sixth, and seventh bit respectively. As it turns out, there is no overlap between the different conceptual balls and every seven-bit word lies in one of the 16 conceptual balls (16*8=128). From another perspective, each of the seven-bit words contained in a conceptual ball, except the codeword itself, may be considered a non-valid codeword. In other words, any one of those seven-bit words may be chosen as the preamble such that it is guaranteed that the preamble does not appear in the messages. When multiple message sequences are concatenated together, for example, it becomes harder to find a good preamble such that it does not appear in the intended digital message, since a partial of a previous 7-bit long message and a partial of a latter 7-bit long message may form more possible patterns. In such cases, guarding bits may also be used between generated codewords. For example, if there are two message sequences: 1000 and 0100, and the corresponding codewords are 0111000 and 1010100 respectively, a guarding bit "1" may be placed between the two codewords, such that the final coded message becomes 0111000 1 1010100. In this case, 0001010 may be chosen as a valid preamble. Otherwise, the preamble appears in the sequence 0111000 1010100 without the guarding bit.

At block 226, the peak location is determined. The peak location corresponds to the center location of the preamble in the received signal.

At block 228, the receiver may compare the peak value at the peak location to a threshold. The threshold value may be obtained since the normalized waveform has the same magnitude and peak-to-peak value, and the local copy of the preamble waveform also always has the same magnitude and peak-to-peak value. These values are also known before the digital message is transmitted and/or received. As a result, when the processor performs the comparison (or cross-correlation) of the normalized waveform to the preamble waveform, the peak value is determined and known before the digital message is transmitted and/or received.

If the peak value is greater than the chosen threshold value at block 228, the receiver has a higher confidence that the receiver synchronization with the received signal is correct. Otherwise, if the peak value is not above the threshold value, the current decoding is rejected at block 229, and the procedure returns to the start at block 210 to continue receiving light-based digital messages.

If, at block 228, the peak value is above the threshold, the peak location is assigned to be a starting location for the receiver synchronization with the received signal at block 230.

In accordance with another example embodiment of the present disclosure, a continuous valued indicator may be computed using the peak value, rather than thresholding the peak value of the cross-correlation to determine a two-level decision (i.e., either to reject or to proceed). The continuous valued indicator may be computed to indicate a confidence level on a successful synchronization for upper layers in the communication link protocol to achieve further improved performance. When using a thresholding technique, this provides for a peak value to either be accepted or rejected. When a continuous valued indicator is adopted, the thresholding technique may still be used to perform either accept or reject decisions. However, in the simplest case, a continuous valued indicator is defined as h=peak value, and pass the value of h to upper layers (later stages), this provides the system with a better understanding of how good the synchronization is if the decision is an accept, or how bad the synchronization is if the decision is a reject. Based on this extra information, the system may make further decisions on how much the performance should be increased, for example, increasing the signal to noise ratio at the transmitter by adjusting the modulation depth.

At block 232, all bit positions may be derived according to the bit width, number of bits in the signal, length of the preamble, and any other waveform structure parameters, that are generally known prior to transmitting and/or receiving the light-based digital message.

At block 234, the signal waveform is demodulated into bits of, for example, "1's" and "0's". The demodulation may be flexible, and may be a matched-based filter technique assuming the bit waveform shape is known, or transition-based techniques, or any other type of demodulation technique depending on the design. After the demodulation at block 234, a sequence of demodulated bits is obtained.

The waveform used to perform the demodulation may be one of the following: the received light-based digital signal, or the signal with the moving average removed in block 216. If significant low frequency interference is present and the matched-filter based demodulation technique is used, the signal with the moving average removed is desirable for the waveform. Otherwise, the raw received light-based digital signal should be used.

At block 236, channel decoding is performed on the sequence of demodulated bits from block 234. The channel coding may be applied at the transmitter to increase the probability of correctly receiving information at the receiver. Carefully designed redundancy is introduced at the transmitter on top of the information bits such that the receiver has a higher chance of correctly receiving the information bit twice. One example of a channel coding with auto-correction of bit errors at the receiver is Hamming-(7, 4), which is a linear error-correcting code that encodes four bits of data into seven bits by adding three parity bits. This Hamming (7, 4), or another type of channel coding, may be used to ensure a high probability of auto-correction of bit errors at the receiver. This particular channel coding scheme guarantees successful 1-bit-error corrections (if the demodulated bit sequence has at most one bit wrong, for every chunk of 7 bits). This step of channel decoding generates the decoding sequence of original transmitted information bits at the transmitter. These information bits may be dynamic or fixed. In case of being fixed, the information bits may correspond to any type of luminaire, LED, or light source intended identification information.

At block 238, the final decoded information bits are obtained and the procedure returns to start to continue to receive and analyze LBC messages.

It will be appreciated in light of the present disclosure that FIG. 2 provides one example methodology for decoding LBC messages, which corresponds to the diagram of FIGS. 3-10. However, other methodologies may be implemented or otherwise varied to arrive at the diagrams. Likewise, FIGS. 3-10 illustrate examples of possible waveforms at the various stages of the procedure, however other graphs or waveforms may result from the procedure of FIG. 2, as will be appreciated in light of the present disclosure.

In the example waveform shown in FIGS. 3-10, the preamble is six (6) bits in length, and in this example is: "1 0 0 0 0 1." The original intended information bit sequence has a length of eight (8), and is divided into two chunks of 4-bit long sequences. For example, using Hamming (7, 4) channel coding, each chunk of 4 bits is transformed into a 7-bit long sequence, with a single bit "1" is inserted in between the two chunks of the 7-bit sequence. As a result, one complete cycle of transmission has a bit stream with a length of 21 bits (6 bits for the preamble, 7 bits for the first 4-bit chunk, 1 bit for the extra bit, 7 bits for the second 4-bit chunk). The entire sequence of the 21 bits in this particular experiment is: "100001 1001001 1 0000000" and the corresponding original intended information is 8-bit long: "10010000". These 21 bits are then realized in the physical layer with Manchester encoding waveform shapes, for example: bit "1" starts with the first half of "high" and ends with the second half of "low"; and bit "0" starts with the first half of "low" and ends with the second half of "high". It will be appreciated that although Manchester encoding is the encoding scheme used in the example embodiment for the physical layer waveform shape generation, any type of waveform generation technique may be used. Similarly, instead of using the Hamming (7, 4) channel coding technique, any other appropriate channel coding with error-correction capability may be used. For example, cyclic codes, repetition codes, parity codes, polynomial codes, and convolution codes.

The transmitter is configured to transmit each cycle of the 21-bit long sequence consecutively (over and over again) without any gap in between. There are no other communication links between the transmitter and the receiver for the purpose of VLC decoding, in accordance with an embodiment of the present disclosure. When the optical receiver element of the receiver device is a camera, the camera may have a resolution of 1920×1080 and has a functionality to perform high frame rate image acquisition for all small region of pixels. The camera may be configured to perform 5,000 frames per second (fps) on a gray scale from 0 to 255 and averaged across this small region. The camera may further be configured to take 255 frames at the frame rate of 5000 fps on the LED.

Figure 3:
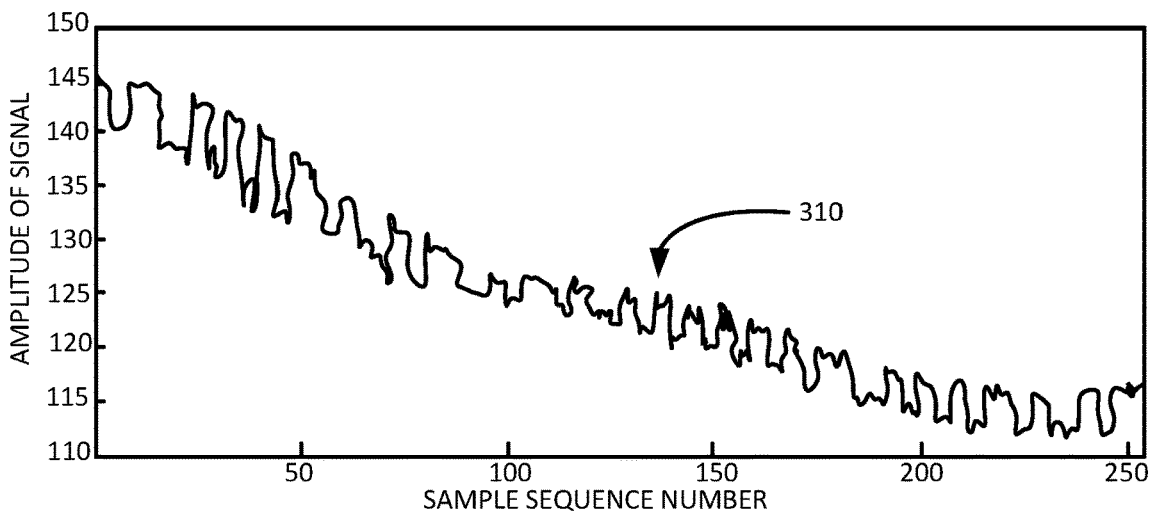
FIG. 3 illustrates an example graphical diagram showing the received light-based digital message, in accordance with an embodiment of the present disclosure.
Figure 4:
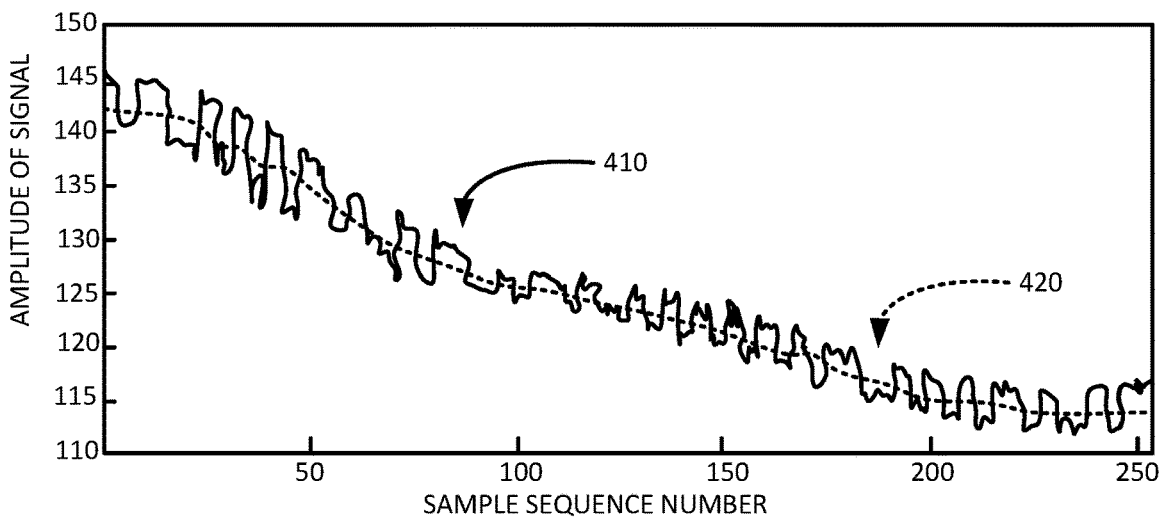
FIG. 4 illustrates an example graphical diagram showing the received light-based digital message and the moving average, in accordance with an embodiment of the present disclosure.
Figure 8:
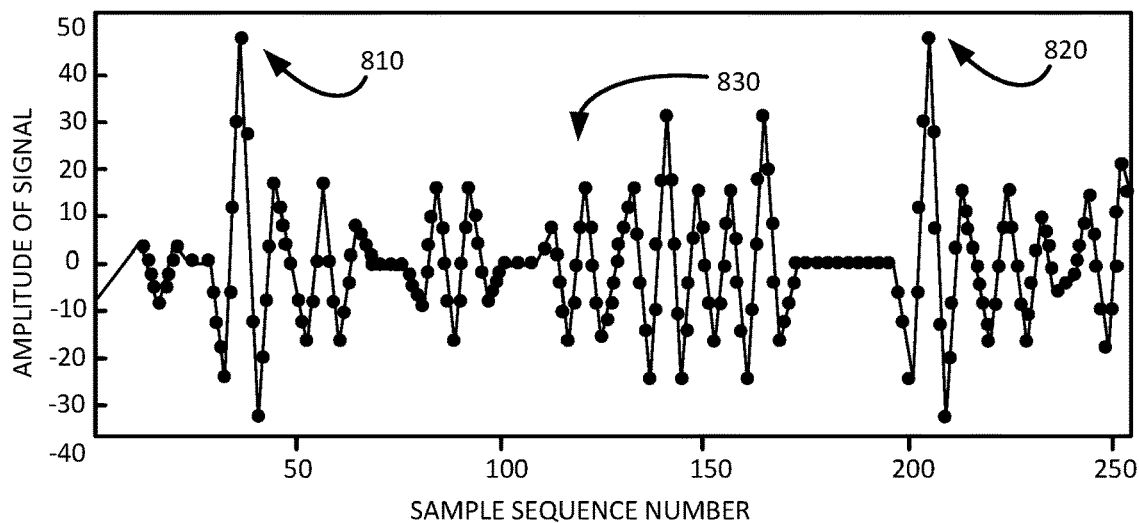
FIG. 8 illustrates an example graphical diagram showing peak locations that correspond to synchronization start locations, in accordance with an embodiment of the present disclosure.
Figure 9:
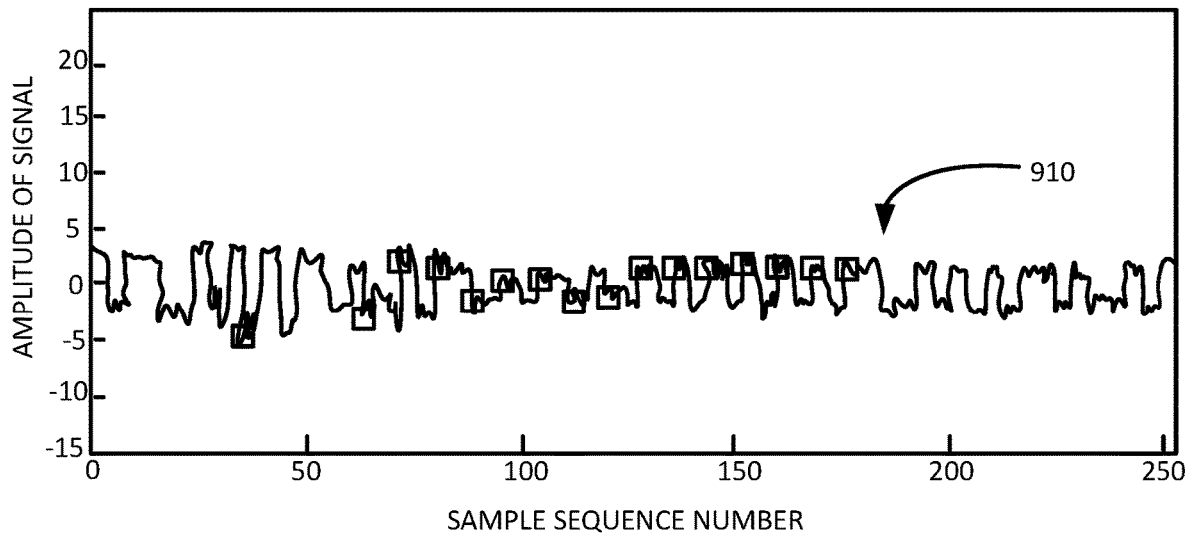
FIG. 9 illustrates an example graphical diagram showing the recovered clock signal, in accordance with an embodiment of the present disclosure.
Figure 10:
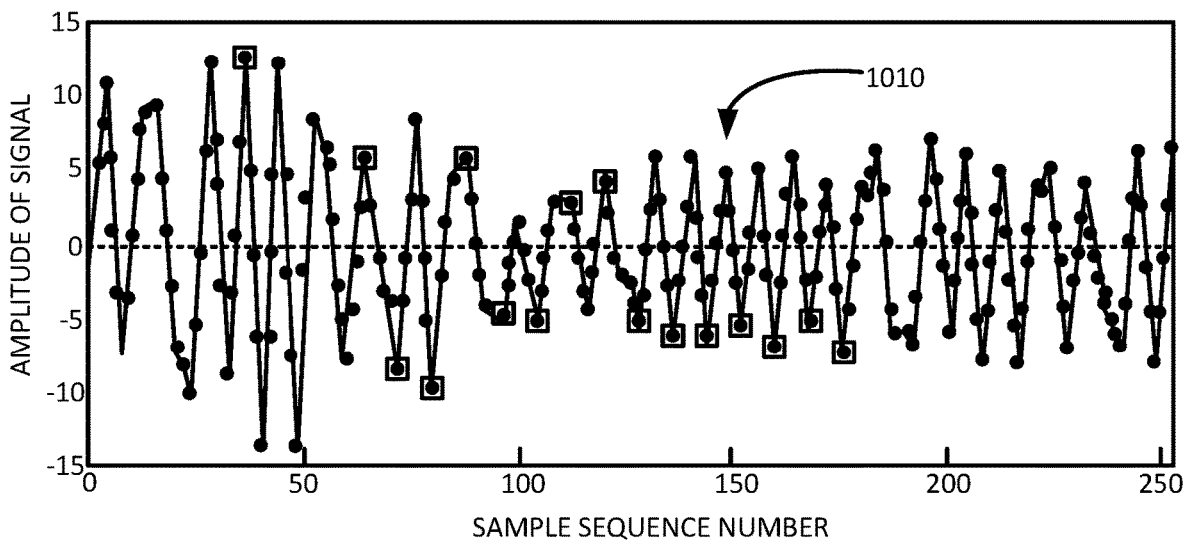
FIG. 10 illustrates an example graphical diagram showing demodulation of the recovered clock signal into 1's and 0's, in accordance with an embodiment of the present disclosure.

As shown in FIGS. 3-10, the waveforms plotted have a length of approximately 255 samples. As shown in FIG. 3 and FIG. 4, there is a dominant low frequency shift on the received digital message, observed as a slope. Following the steps of the methodology for decoding, the waveform may be successfully decoded back into the original transmitted information as shown in FIG. 10. Note that at box 236, the channel decoding is not illustrated, but is a well-defined mathematical operation to transform a 7-bit long sequence into a 4-bit long sequence. The aforementioned 1-bit error auto correction is embedded in this mathematical operation.

FIG. 3 illustrates an example graphical diagram showing the raw received signal 310, in accordance with an embodiment of the present disclosure. The example graphical diagram shows the received light-based digital message 310, which for example may correspond to block 212 of the methodology of FIG. 2. FIGS. 3-10 illustrate various example graphical diagrams that may correspond to various blocks of the methodology of FIG. 2. Refer to FIG. 2 for an example methodology for decoding LBC messages received at a receiver device, in accordance with an embodiment of the present disclosure.

FIG. 4 illustrates an example graphical diagram showing the received light-based digital message 410 and the moving average 420, in accordance with an embodiment of the present disclosure. The example graphical diagram shows the received light-based digital message 410 and the moving average 420, which for example may correspond to block 214 of the methodology of FIG. 2. The resulting message after removal of the moving average may be referred to as a second LBC digital message.

Figure 5:
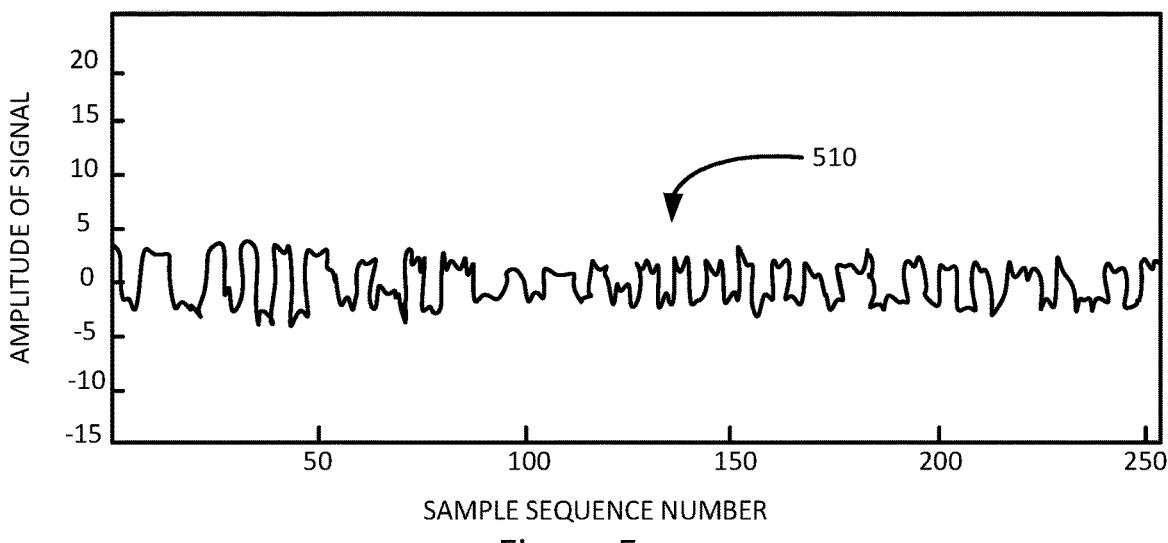
FIG. 5 illustrates an example graphical diagram showing the light-based digital message after the moving average has been removed, in accordance with an embodiment of the present disclosure.

FIG. 5 illustrates an example graphical diagram showing the second LBC digital message after the moving average has been removed, in accordance with an embodiment of the present disclosure. The example graphical diagram shows the second LBC digital message 510 after the moving average has been removed, which for example may correspond to block 216 of the methodology of FIG. 2. Note that the slope of FIG. 3 and FIG. 4 has been evened out in FIG. 5, which allows data to still be decoded during noises and/or interferences.

Figure 6:
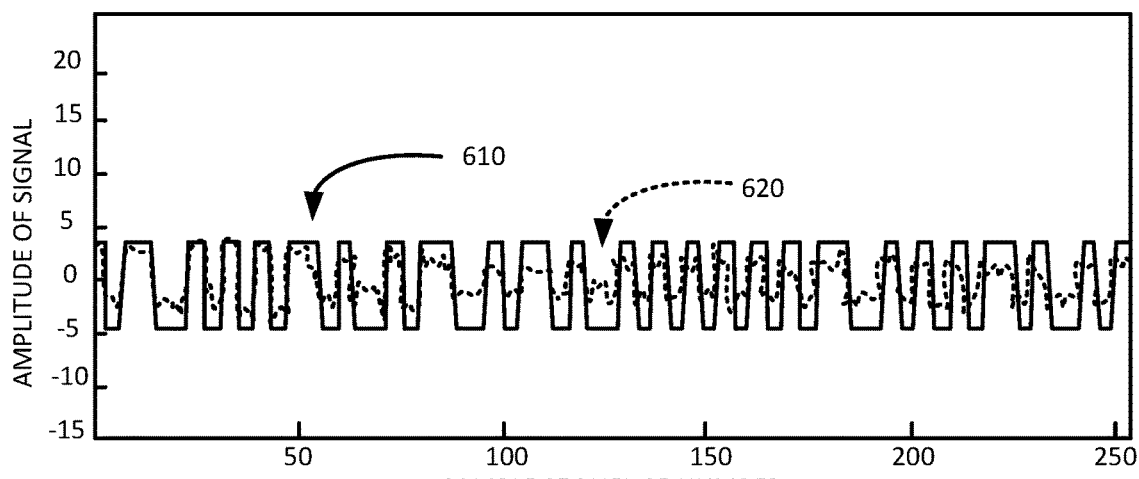
FIG. 6 illustrates an example graphical diagram showing an expansion of the light-based digital message with the moving average removed, in accordance with an embodiment of the present disclosure.

FIG. 6 illustrates an example graphical diagram showing an expansion of the second LBC digital message with the moving average removed, in accordance with an embodiment of the present disclosure. The second LBC digital message 610 (with the moving average removed) is shown, as well as the expanded waveform 620. The example graphical diagram shows an expansion of the second LBC signal, which for example may correspond to block 220 of the methodology of FIG. 2.

Figure 7:
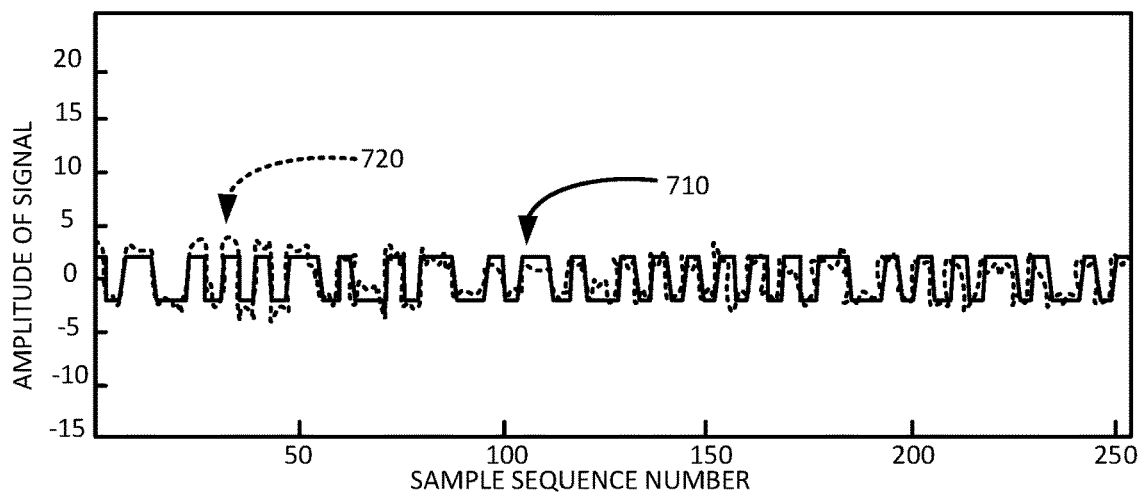
FIG. 7 illustrates an example graphical diagram showing a normalized waveform and the digital message with the moving average removed, in accordance with an embodiment of the present disclosure.

FIG. 7 illustrates an example graphical diagram showing a normalized waveform and the digital message with the moving average removed, in accordance with an embodiment of the present disclosure. The second LBC digital message 710 (with the moving average removed) is shown, as well as the normalized waveform 720. The example graphical diagram shows a normalized waveform, which for example may correspond to block 222 of the methodology of FIG. 2.

FIG. 8 illustrates an example graphical diagram showing peak locations 810, 820 in the digital message that correspond to synchronization start locations for clock synchronization, in accordance with an embodiment of the present disclosure. The waveform 830 shows the cross-correlation of the digital message with the known preamble. The example graphical diagram shows peak locations that correspond to synchronization start locations, which for example may correspond to blocks 224 through 230 of the methodology of FIG. 2.

FIG. 9 illustrates an example graphical diagram showing the recovered clock signal, in accordance with an embodiment of the present disclosure. The waveform 910 is the second LBC digital message with the removed clock and clock synchronization start location. The example graphical diagram shows the recovered clock signal, which for example may correspond to block 232 of the methodology of FIG. 2.

FIG. 10 illustrates an example graphical diagram showing demodulation of the recovered clock signal into 1's and 0's, in accordance with an embodiment of the present disclosure. The example graphical diagram shows a demodulated waveform 1010 resulting from demodulation of the recovered clock signal into 1's and 0's, which for example may correspond to block 234 of the methodology of FIG. 2.

Performance of LBC Link with Channel Coding—BER and Transmission Rate

Figure 11:
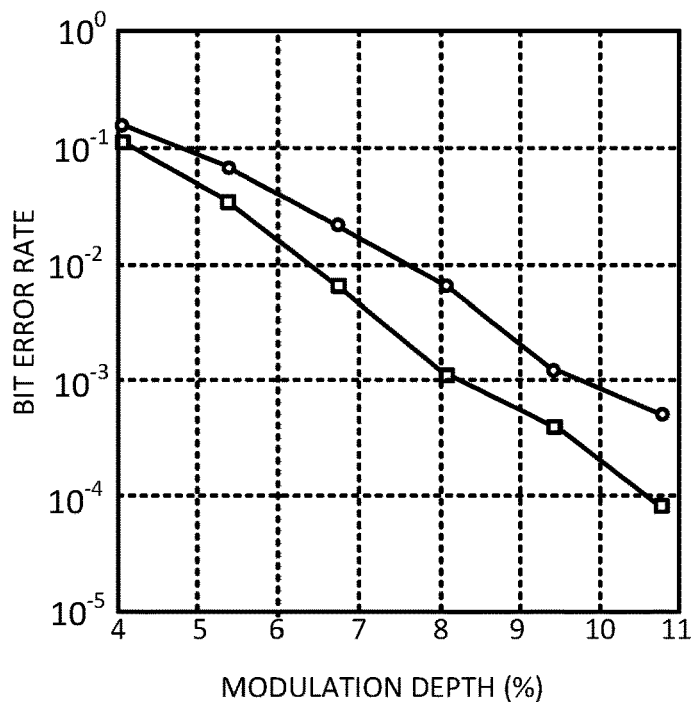
FIG. 11 illustrates an example graphical diagram showing a bit error rate (BER) study of the LBC link of a digital message having standard encoding as compared to a digital message encoded in accordance with an embodiment of the present disclosure.
Figure 12:
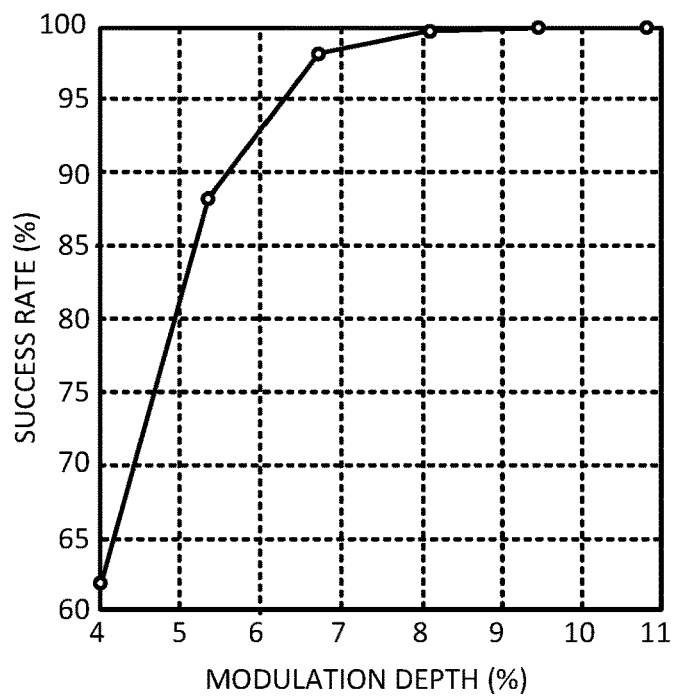
FIG. 12 illustrates an example graphical diagram showing a successful identifier transmission rate, in accordance with an embodiment of the present disclosure.

The overall performance of the LBC communication path ("link") having channel coding in accordance with an embodiment of the present disclosure is compared to traditional LBC communication for the bit error rate (BER) and the transmission rate, as shown in FIG. 11 and FIG. 12, respectively.

FIG. 11 illustrates an example graphical diagram showing a bit error rate (BER) study of an LBC digital message (top curve) as compared to the LBC digital message with the channel coding (bottom curve) in accordance with an embodiment of the present disclosure. As shown in FIG. 11, for channel coding of the LBC digital message the link BER drops significantly as the modulation depth increases. The modulation depth is calculated by finding the peak-to-peak current variation caused by modulating the waveform onto the LED light emission and the average current passing through the LED. In particular, the modulation depth is equal to the peak-to-peak current difference divided by the average current. As it may also be observed in FIG. 11, the effective BER is also improved compared to the BER without using channel coding.

FIG. 12 illustrates an example graphical diagram showing a successful identifier transmission rate, in accordance with an embodiment of the present disclosure. As shown in FIG. 12, this particular example study was performed by configuring the LED to transmit an 8-bit long identification (ID) sequence repeatedly and without gap in between transmissions. The camera decoded this ID reliably for modulation depth greater than 8%. As the modulation depth increases, the successful ID transmission or receiving rate goes to 100%. Note that according the example experiment, the round LED light emitting surface has a diameter of 0.5 inches, the average current passing through the LED is 260 mA with an approximate luminous flux output of around 8001 m, and the distance between the LED and the camera is approximately 13 meters. It will be appreciated in light of the present disclosure that the link performance may further be improved by providing a larger effective light emitting surface of a luminaire, LED, or other light source, by increasing the lumen output, or by shortening the distance between the transmitter device and the receiver device.

Other structures may be implemented to achieve techniques as variously provided herein, as will be appreciated. For example, instead of using an imaging sensor, a photo diode with associated digital sampling control may be used along with an appropriate optical lens. In such an embodiment, overall communication speed may also be increased since higher sampling rates may be achieved with photo diodes and high speed analog-to-digital converters. In another example, instead of using the moving average to remove low frequency interference, a blind source separation technique may be used to achieve a similar result of removal of low frequency interference. In blind source separation (BSS), a set of source signals are "mixed" using a matrix to produce a set of "mixed" signals. Blind source separation separates the set of mixed signals, through the determination of an "un-mixing matrix" to recover an approximation of the original signals.

Numerous variations and configurations will be apparent in light of the disclosure. For example, one example embodiment of the present disclosure provides a method of decoding light-based digital messages, the method including receiving, at a sensor of a receiver device, a light-based digital message transmitted from a transmitter device, determining, by a processor of the receiver device, a moving average of the light-based digital message, removing, by the processor, the moving average from the light-based digital message to obtain a second light-based digital message, the second light-based digital message having a plurality of data points, determining, by the processor, a peak data point of the plurality of data points in the second light-based digital message having a maximum amplitude value, using, by the processor, the peak data point as a starting point for clock synchronization when the maximum amplitude value of the peak data point is above a threshold value, determining, by the processor, a plurality of sampling points using the starting point for clock synchronization, generating, by the processor, logical maximum or minimum values for at least some of the plurality of sampling points, and decoding, by the processor, the logical maximum or minimum values to generate a decoded sequence of data representative of the light-based digital message.

In some embodiments, the method further includes comparing, by the processor, a received preamble of the second light-based digital message to a stored preamble in a local memory coupled to the processor. In some embodiments, determining the plurality of sampling points is based on at least one parameter of the second light-based digital message, in which the at least one parameter includes at least one of bit width, a number of bits in the light-based digital message, and a length of a preamble of the light-based digital message. In some embodiments, the moving average is a length-preserving moving average and determining the moving average of the light-based digital message includes selecting a window size for the moving average based on at least one parameter of the light-based digital message. In some embodiments, the at least one parameter includes at least one of a signal frequency of the light-based digital message and a waveform shape of the light-based digital message. In some embodiments, the method further including, after removing the moving average from the light-based digital message, performing waveform expansion to generate an expanded light-based digital message by replacing one or more of the plurality of sampling points of the light-based digital message with a received maximum value or a received minimum value of the light-based digital message. In some embodiments, the method further includes performing waveform normalization on the expanded light-based digital message to obtain the second light-based digital signal, in which waveform normalization includes replacing the received maximum value and the received minimum value with, respectively, a specific first value and a specific second value. In some embodiments, generating the logical maximum or minimum values is performed by at least one of a matched-filter based detection and a transition based detection on the plurality of sampling points. In some embodiments, the sensor includes at least one of an imaging sensor, a photo detector, and a matrix of photodetectors. In some embodiments, the sensor receives a plurality of light-based digital messages transmitted from a plurality of transmitter devices, and the processor is configured to decode each of the plurality of light-based digital messages in parallel. In some embodiments, the threshold value includes a continuous valued indicator that computes a confidence level using the peak data point. In some embodiments, the method further includes communicating, via a first communication interface of the receiver device, with a second communication interface of the transmitter device, via a wireless communication channel to allow for wireless communication distinct from the light-based digital message.

Additional embodiments disclosed herein include a receiver device used in light-based communication with a transmitter device. The receiver device includes a sensor configured to receive a light-based digital message from the transmitter device, and a processor coupled to the sensor and configured to decode the light-based digital message by determining a moving average of the light-based digital message, removing the moving average from the light-based digital message to obtain a second light-based digital message, the second light-based digital message having a plurality of data points, determining a peak data point of the plurality of data points in the second light-based digital message having a maximum amplitude value, using the peak data point as a starting point for clock synchronization when the maximum amplitude value of the peak data point is above a threshold value, determining a plurality of sampling points using the starting point for clock synchronization, generating logical maximum or minimum values for at least some of the plurality of sampling points, and decoding the logical maximum or minimum values to generate a decoded sequence of data representative of the light-based digital message.

In some embodiments, the sensor includes at least one of an imaging sensor, a photo detector, and a matrix of photodetectors. In some embodiments, the receiver device further includes a communication module coupled to the processor that is configured to establish a wireless communication channel with the transmitter device, the communication channel being distinct from a communication channel associated with the light-based digital message. In some embodiments, the processor is further configured to determine if a modulation depth of the light-based digital message enables accurate decoding of the light-based digital message, and instruct the transmitter device, via the wireless communication channel, to increase the modulation depth of the light-based digital message in response to determining that the modulation depth does not enable accurate decoding of the light-based digital message.

Additional embodiments disclosed herein include a computer program product including one or more non-transitory machine readable mediums encoded with instructions that when executed by one or more processors cause a process to be carried out on a receiver device for decoding light-based digital messages. The process includes receiving a light-based digital message transmitted from a transmitter device, determining a moving average of the light-based digital message, removing the moving average from the light-based digital message to obtain a second light-based digital message, the second light-based digital message having a plurality of data points, determining a peak data point of the plurality of data points in the second light-based digital message having a maximum amplitude value, using the peak data point as a starting point for clock synchronization when the maximum amplitude value of the peak data point is above a threshold value, determining a plurality of sampling points using the starting point for clock synchronization, generating logical maximum or minimum values for each of the plurality of sampling points, and decoding the logical maximum or minimum values to generate a decoded sequence of data representative of the light-based digital message.

In some embodiments, the process further includes, after removing the moving average from the light-based digital message, performing waveform expansion to generate an expanded light-based digital message by replacing each of the plurality of sampling points of the light-based digital message with a received maximum value or a received minimum value of the light-based digital message. In some embodiments, the process further includes performing waveform normalization on the expanded light-based digital message to obtain the second light-based digital signal, in which waveform normalization includes replacing the received maximum value and the received minimum value with, respectively, a specific first value and a specific second value. In some embodiments, the process further includes communicating, via a first communication interface of the receiver device, with a second communication interface of the transmitter device, via a wireless communication path to allow for wireless communication distinct from a light-based digital message path.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. A method of decoding light-based digital messages, the method comprising:
   receiving, at a sensor of a receiver device, a light-based digital message transmitted from a transmitter device;
   determining, by a processor of the receiver device, a moving average of the light-based digital message;
   removing, by the processor, the moving average from the light-based digital message to obtain a second light-based digital message, the second light-based digital message having a plurality of data points;
   determining, by the processor, a peak data point of the plurality of data points in the second light-based digital message having a maximum amplitude value;
   using, by the processor, the peak data point as a starting point for clock synchronization when the maximum amplitude value of the peak data point is above a threshold value;
   determining, by the processor, a plurality of sampling points using the starting point for clock synchronization;
   generating, by the processor, logical maximum or minimum values for at least some of the plurality of sampling points; and
   decoding, by the processor, the logical maximum or minimum values to generate a decoded sequence of data representative of the light-based digital message.

2. The method of claim 1, further comprising comparing, by the processor, a received preamble of the second light-based digital message to a stored preamble in a local memory coupled to the processor.

3. The method of claim 1, wherein determining the plurality of sampling points is based on at least one parameter of the second light-based digital message, wherein the at least one parameter comprises at least one of bit width, a number of bits in the light-based digital message, and a length of a preamble of the light-based digital message.

4. The method of claim 1, wherein the moving average is a length-preserving moving average and determining the moving average of the light-based digital message comprises selecting a window size for the moving average based on at least one parameter of the light-based digital message.

5. The method of claim 4, wherein the at least one parameter comprises at least one of a signal frequency of the light-based digital message and a waveform shape of the light-based digital message.

6. The method of claim 1, further comprising, after removing the moving average from the light-based digital message, performing waveform expansion to generate an expanded light-based digital message by replacing one or more of the plurality of sampling points of the light-based digital message with a received maximum value or a received minimum value of the light-based digital message.

7. The method of claim 6, further comprising performing waveform normalization on the expanded light-based digital message to obtain the second light-based digital signal, wherein waveform normalization comprises replacing the received maximum value and the received minimum value with, respectively, a specific first value and a specific second value.

8. The method of claim 1, wherein generating the logical maximum or minimum values is performed by at least one of a matched-filter based detection and a transition based detection on the plurality of sampling points.

9. The method of claim 1, wherein the sensor comprises at least one of an imaging sensor, a photo detector, and a matrix of photodetectors.

10. The method of claim 1, wherein the sensor receives a plurality of light-based digital messages transmitted from a plurality of transmitter devices, and the processor is configured to decode each of the plurality of light-based digital messages in parallel.

11. The method of claim 1, wherein the threshold value comprises a continuous valued indicator that computes a confidence level using the peak data point.

12. The method of claim 1, further comprising communicating, via a first communication interface of the receiver device, with a second communication interface of the transmitter device, via a wireless communication channel to allow for wireless communication distinct from the light-based digital message.

13. A receiver device used in light-based communication with a transmitter device, the receiver device comprising:
   a sensor configured to receive a light-based digital message from the transmitter device; and
   a processor coupled to the sensor configured to decode the light-based digital message by:
      determining a moving average of the light-based digital message;
      removing the moving average from the light-based digital message to obtain a second light-based digital message, the second light-based digital message having a plurality of data points;
      determining a peak data point of the plurality of data points in the second light-based digital message having a maximum amplitude value;
      using the peak data point as a starting point for clock synchronization when the maximum amplitude value of the peak data point is above a threshold value;
      determining a plurality of sampling points using the starting point for clock synchronization;
      generating logical maximum or minimum values for at least some of the plurality of sampling points; and
      decoding the logical maximum or minimum values to generate a decoded sequence of data representative of the light-based digital message.

14. The receiver device of claim 13, wherein the sensor comprises at least one of an imaging sensor, a photo detector, and a matrix of photodetectors.

15. The receiver device of claim 13, further comprising a communication module coupled to the processor that is configured to establish a wireless communication channel with the transmitter device, the communication channel being distinct from a communication channel associated with the light-based digital message.

16. The receiver device of claim 15, wherein the processor is further configured to:
   determine if a modulation depth of the light-based digital message enables accurate decoding of the light-based digital message; and
   instruct the transmitter device, via the wireless communication channel, to increase the modulation depth of the light-based digital message in response to determining that the modulation depth does not enable accurate decoding of the light-based digital message.

17. A computer program product including one or more non-transitory machine readable mediums encoded with instructions that when executed by one or more processors cause a process to be carried out on a receiver device for decoding light-based digital messages, the process comprising:
   receiving a light-based digital message transmitted from a transmitter device;
   determining a moving average of the light-based digital message;
   removing the moving average from the light-based digital message to obtain a second light-based digital message, the second light-based digital message having a plurality of data points;
   determining a peak data point of the plurality of data points in the second light-based digital message having a maximum amplitude value;
   using the peak data point as a starting point for clock synchronization when the maximum amplitude value of the peak data point is above a threshold value;
   determining a plurality of sampling points using the starting point for clock synchronization;
   generating logical maximum or minimum values for each of the plurality of sampling points; and
   decoding the logical maximum or minimum values to generate a decoded sequence of data representative of the light-based digital message.

18. The computer program product of claim 17, wherein the process further comprises, after removing the moving average from the light-based digital message, performing waveform expansion to generate an expanded light-based digital message by replacing each of the plurality of sampling points of the light-based digital message with a received maximum value or a received minimum value of the light-based digital message.

19. The computer program product of claim 18, wherein the process further comprises performing waveform normalization on the expanded light-based digital message to obtain the second light-based digital signal, wherein waveform normalization comprises replacing the received maximum value and the received minimum value with, respectively, a specific first value and a specific second value.

20. The computer program product of claim 17, wherein the process further comprises communicating, via a first communication interface of the receiver device, with a second communication interface of the transmitter device, via a wireless communication path to allow for wireless communication distinct from a light-based digital message path.

* * * * *